(12) United States Patent
Ahmed

(10) Patent No.: US 12,274,996 B1
(45) Date of Patent: Apr. 15, 2025

(54) GEOPOLYMER COMPOSITE FOR WATER DECONTAMINATION

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/966,274

(22) Filed: Dec. 3, 2024

(51) Int. Cl.

| | |
|---|---|
| *B01J 20/16* | (2006.01) |
| *B01D 15/20* | (2006.01) |
| *B01D 15/42* | (2006.01) |
| *B01J 20/28* | (2006.01) |
| *B01J 20/30* | (2006.01) |
| *B01J 20/34* | (2006.01) |
| *C02F 1/28* | (2023.01) |

(52) U.S. Cl.
CPC ............ *B01J 20/16* (2013.01); *B01D 15/203* (2013.01); *B01D 15/424* (2013.01); *B01J 20/28059* (2013.01); *B01J 20/28071* (2013.01); *B01J 20/28083* (2013.01); *B01J 20/3071* (2013.01); *B01J 20/3078* (2013.01); *B01J 20/3475* (2013.01); *C02F 1/288* (2013.01); *C02F 1/281* (2013.01); *C02F 1/285* (2013.01); *C02F 2303/16* (2013.01)

(58) Field of Classification Search
None
See application file for complete search history.

(56) References Cited

U.S. PATENT DOCUMENTS 11,554,348 B2   1/2023   Gu et al.

FOREIGN PATENT DOCUMENTS

| CN | 107128947 A | 9/2017 |
| CN | 112390576 A | 2/2021 |
| CN | 114409286 A | 4/2022 |

OTHER PUBLICATIONS

Khalifa et al. (Journal of Inorganic and Organometallic Polymers and Materials, 2020, 30, 2182-2196). (Year: 2020).*
Hailu et al. (Journal of Environmental Chemical Engineering, 2017, 5, 3319-3329). (Year: 2017).*
Falah et al. (Journal of Hazardous Materials, 2016, 318, 772-782). (Year: 2016).*
Luhar et al. (Materials, 2021, 14, 7456). (Year: 2021).*
Abdelrahman et al. (Journal of Inorganic and Organometallic Polymers and Materials, 2020, 30, 2440-2463). (Year: 2020).*

(Continued)

*Primary Examiner* — Clare M Perrin
(74) *Attorney, Agent, or Firm* — Oblon, McClelland, Maier & Neustadt, L.L.P.

(57) ABSTRACT

A geopolymer composite including a porous aluminosilicate material, a quaternary ammonium surfactant, and a hydrophobicity modifier that includes dibenzoylmethane. The quaternary ammonium surfactant occupies sodium (Na) vacancies in the porous aluminosilicate material, and the hydrophobicity modifier is disposed on the quaternary ammonium surfactant.

20 Claims, 6 Drawing Sheets

(56) References Cited

OTHER PUBLICATIONS

Bo Meng, et al., "Modified bentonite by polyhedral oligomeric silsesquioxane and quaternary ammonium salt and adsorption characteristics for dye", Journal of Saudi Chemical Society, vol. 24, No. 3, Jan. 28, 2020, pp. 334-344.

Dogan Karadag, et al., "Adsorption Equilibrium and Kinetics of Reactive Black 5 and Reactive Red 239 in Aqueous Solution Onto Surfactant-Modified Zeolite", Journal of Chemical & Engineering Data, vol. 52, No. 5, Jun. 29, 2007, pp. 1615-1620.

Solomon Legese Hailu, et al., "Preparation and characterization of cationic surfactant modified zeolite adsorbent material for adsorption of organic and inorganic industrial pollutants", Journal of Environmental Chemical Engineering, vol. 5, No. 4. Aug. 2017, pp. 3319-3329, 6 pages.

\* cited by examiner

GEOPOLYMER COMPOSITE FOR WATER DECONTAMINATION

BACKGROUND

Technical Field

The present disclosure is directed to a geopolymer composite for water decontamination.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Geopolymers are known for their stability, low cost, and environmentally friendly synthesis, making them highly useful in various industrial processes. However, traditional geopolymers are often limited by their relatively low surface area, insufficient pore volume, and inefficient adsorption capacity, reducing their effectiveness in adsorption, catalysis, filtration, and other chemical processing applications.

Davidovits laid the foundational chemistry of geopolymers and explored their potential uses [Davidovits, J., Geopolymer, 1999, 99, 292, 9-39]. While it provides a solid understanding of geopolymers, it does not delve into the integration of organic and surfactant molecules.

Provis and group reported on the structures and properties of traditional geopolymers and their industrial applications [Provis, J. L., & Van Deventer, J. S. J., Eds., Geopolymers: structures, processing, properties and industrial applications. Elsevier, 2009]. Although it provides a detailed look into the science of geopolymers, it lacks the innovative approach of enhancing surface area and adsorption properties by including organic compounds and surfactants.

U.S. Pat. No. 6,485,857 B1 discusses a process for synthesizing geopolymer binders using various aluminosilicate sources. While this patent outlines a robust method for binder synthesis, it does not address surface modification. Similarly, U.S. Pat. No. 8,008,392 B2 focuses on utilizing geopolymers in construction materials. This invention emphasizes the structural benefits of geopolymers but does not explore the possibility of integrating organic surface modifiers. This lack of control over the surface of a geopolymer dramatically limits the applications of these materials.

Accordingly, one objective of the present disclosure is to provide a geopolymer composite that may circumvent the aforementioned stated drawbacks and achieve enhanced functional properties and activity.

SUMMARY

According to a first aspect, the present disclosure relates to a geopolymer composite. In some embodiments, the geopolymer composite includes a porous aluminosilicate material, a quaternary ammonium surfactant, and a hydrophobicity modifier, including dibenzoylmethane. In some embodiments, the quaternary ammonium surfactant occupies sodium (Na) vacancies in the porous aluminosilicate material. In some embodiments, the hydrophobicity modifier is disposed on the quaternary ammonium surfactant.

In some embodiments, the quaternary ammonium surfactant is cetyltrimethylammonium bromide (CTAB).

In some embodiments, the hydrophobicity modifier consists of dibenzoylmethane.

In some embodiments, the geopolymer composite is amorphous by powder X-ray diffraction (PXRD).

In some embodiments, the geopolymer composite is substantially free of sodium by energy-dispersive X-ray spectroscopy (EDX).

In some embodiments, the porous aluminosilicate material has an atomic ratio of aluminum to silicon of 1:1 to 1:5.

In some embodiments, the geopolymer composite includes 4.0 to 8.5 percent by weight (wt. %) aluminum, 15.0 to 25.0 wt. % silicon, and 24 to 35 wt. % carbon, each based on a total weight of geopolymer composite.

In some embodiments, the geopolymer composite has a surface area of 47.0 to 60.0 square meters per gram ($m^2/g$).

In some embodiments, the geopolymer composite has a pore volume of 0.175 to 0.250 cubic centimeters per gram ($cm^3/g$).

In some embodiments, the geopolymer composite has a mean pore diameter of 6.75 to 8.50 nanometers (nm).

In some embodiments, the geopolymer composite is substantially free of an organosilicon compound.

The present disclosure also relates to a method of forming the geopolymer composite. In some embodiments, the method includes reacting an aluminum solution, including an aluminum source with a silica solution including a silica source to form the porous aluminosilicate material; mixing the porous aluminosilicate material with the quaternary ammonium surfactant in water for 1 to 6 hours (h) to form an intermediate. In some embodiments, the method further includes adding to the intermediate a hydrophobicity modifier solution, including dibenzoylmethane to form a reaction mixture; heating the reaction mixture to 80 to 125 degrees Celsius (° C.) until dryness to form a crude product, and washing the crude product with water to form the geopolymer composite.

In some embodiments, the aluminum source is aluminum chloride ($AlCl_3 \cdot 6H_2O$), and the silica source is sodium metasilicate ($Na_2SiO_3 \cdot 5H_2O$).

In some embodiments, the quaternary ammonium surfactant is CTAB.

In some embodiments, the hydrophobicity modifier solution includes methanol.

In some embodiments, the hydrophobicity modifier consists of dibenzoylmethane.

In some embodiments, the porous aluminosilicate material is mixed with the quaternary ammonium surfactant in a ratio of 1:1 to 10:1 by weight, and the reaction mixture has a weight ratio of intermediate to hydrophobicity modifier of 0.25:1 to 4:1.

In some embodiments, the method further includes washing the porous aluminosilicate material with water, prior to mixing the porous aluminosilicate material with the quaternary ammonium surfactant.

The present disclosure also relates to a method of removing a contaminant from water. In some embodiments, the method includes contacting a contaminated water, including the contaminant with the geopolymer composite, thereby forming a purified water and a contaminated composite, and separating the purified water and contaminated composite. In some embodiments, the contaminant is at least one selected from the group consisting of a dye, a phenol, a polycyclic aromatic hydrocarbon, an herbicide, a pesticide, an antibiotic, a persistent organic pollutant, and a heavy metal.

In some embodiments, the method of removing the contaminant from water further includes eluting the contaminant from the contaminated composite by washing with a wash solvent.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'compound' refers to a chemical entity, regardless of its phase-solid, liquid, or gaseous—as well as its state—crude mixture, purified or isolated.

As used herein, the term 'porosity' refers to a measure of the void or vacant spaces within a material.

As used herein, the term 'pore size' may be thought of as the length or longest dimension of a pore opening.

As used herein, the term 'room temperature' refers to a temperature range of '25 degrees Celsius (° C.)+3° C. in the present disclosure.

As used herein, the term 'geopolymer' refers to an amorphous sodium aluminum silicate material formed through the chemical reaction of an aluminum precursor (such as aluminum chloride) and a silicon precursor (such as sodium metasilicate).

As used herein, the term 'contaminant' refers to a substance introduced into the environment that has undesired or even detrimental consequences.

As used herein, the term 'adsorption' refers to the adhesion of atoms, ions, or molecules from a gas, liquid, or dissolved solid to a surface.

A weight percent of a component, unless specifically stated to the contrary, is based on the total weight of the formulation or composition in which the component is included. For example, if a particular element or component in a composition or article is said to have 5 weight percentage (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include 13C and 14C. Isotopes of oxygen include 16O, 17O, and 18O.

According to a first aspect, the present disclosure relates to a geopolymer composite. In some embodiments, the geopolymer composite includes a porous aluminosilicate material, a quaternary ammonium surfactant, and a hydrophobicity modifier, including dibenzoylmethane.

A geopolymer can be defined as an amorphous sodium aluminum silicate material formed through the chemical reaction of an aluminum precursor and a silicon precursor. The term "amorphous" refers to the lack of a long-range ordered crystalline structure in the resulting material, leading to a highly cross-linked network of aluminum and silicon tetrahedra. In this structure, silicon atoms ($Si^{4+}$) and aluminum atoms ($Al^{3+}$) are coordinated with oxygen atoms ($O^{2-}$), forming a framework of $SiO_4$ and $AlO_4$ tetrahedra. Since aluminum has a +3 charge, replacing some silicon atoms (which normally have a +4 charge in the $SiO_4$ tetrahedra) with aluminum creates a deficiency of positive charge. This deficiency leads to the formation of a negative charge on the $AlO_4$ units in the framework. To balance this negative charge, positively charged ions (cations), such as sodium ($Na^+$), are incorporated into the structure to maintain electrical neutrality. These sodium ions typically reside within the amorphous geopolymer matrix, balancing the overall charge and stabilizing the structure.

In some embodiments, the geopolymer composite includes a porous aluminosilicate material. An aluminosilicate material is a material composed mostly of aluminum, silicon, and oxygen atoms containing anionic Si—O—Al linkages. Aluminosilicates typically comprise $SiO_4$ tetrahedra and $AlO_4^-$ tetrahedra, $AlO_6$ octahedra, and/or $Al(OH)_6$ octahedra joined together in a wide variety of structural motifs. The tetrahedra and octahedra in the aluminosilicate material of the present invention may in general adopt any structural motif present in other aluminosilicate materials, such as isolated tetrahedra as in neosilicates (single tetrahedra, also called orthosilicates) and sorosilicates (double tetrahedra), chains of tetrahedra such as inosilicates (both single chain as in pyroxene group silicates and double chain as in amphibole group silicates), rings of tetrahedra as in cyclosilicates, sheets of tetrahedra as in phyllosilicates, and three-dimensional frameworks as in tectosilicates. In some aluminosilicates, the material comprises a substructure comprising silicon-containing and/or aluminum-containing tetrahedral and a substructure comprising aluminum-containing octahedral. An example of such an arrangement is the mineral kaolin, which comprises sheets of alternating tetrahedra-containing layers and octahedra-containing layers. The arrangement of isolated tetrahedra, chains of tetrahedra, sheets of tetrahedra, or three-dimensional frameworks may give rise to channels, pores, cages, or other spaces within the aluminosilicate which is capable of hosting material which is not the aluminosilicate itself. Examples of materials, particularly those relevant to the current disclosure, include water, organic molecules, and inorganic nanoparticles. While the larger structures formed of tetrahedra (i.e. chains, rings, sheets, and three-dimensional frameworks) may themselves be ordered, the arrangement of these larger structures may be disordered. Such disorder may give rise to a material which is amorphous by techniques for determining crystallinity or crystal structure such as powder X-ray diffraction (PXRD). A porous aluminosilicate material may include a network of pores capable of holding and/or reacting molecules or ions inside its framework. Such pores (and channels or pathways between them) may be formed by the exact arrangement of the tetrahedra (and octahedra) present in the aluminosiliate material.

In general, any aluminosilicate material or combination thereof known in the art may be used. Suitable examples of aluminosilicate materials include, but are not limited to, metakaolin, calcined kaolin clay, fly ash, blast furnace slag, phosphate-type clay, alumino-silica containing ash, natural aluminosilicates, aluminosilicate glass powders, vitreous calcium aluminosilicate, zeolite molecular sieves, scoria, allophane, bentonite, pumice, and the like. In some embodiments, the aluminosilicate material is an amorphous aluminosilicate phase.

Aluminosilicate materials may be characterized by a ratio of Si to Al (or vice-versa) present in the material. In general, the aluminosilicate material may have any suitable Al:Si molar ratio. In some embodiments, the porous aluminosilicate material has an atomic ratio of aluminum to silicon of 1:1-1:5. For example, the porous aluminosilicate material may have a ratio of Al:Si of 1:1.0, 1:1.1, 1:1.2, 1:1.3, 1:1.4, 1:1.5, 1:1.6, 1:1.7, 1:1.8, 1:1.9, 1:2.0, 1:2.1, 1:2.2, 1:2.3, 1:2.4, 1:2.5, 1:2.6, 1:2.7, 1:2.8, 1:2.9, 1:3.0, 1:3.1, 1:3.2, 1:3.3, 1:3.4, 1:3.5, 1:3.6, 1:3.7, 1:3.8, 1:3.9, 1:4.0, 1:4.1, 1:4.2, 1:4.3, 1:4.4, 1:4.5, 1:4.6, 1:4.7, 1:4.8, 1:4.9, or 1:5.0.

In some embodiments, the geopolymer composite includes a quaternary ammonium surfactant. As used herein, the term "surfactant" refers to a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier.

A surfactant molecule comprises one or more hydrophilic head units attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl) dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3$—$(CH_2)_{10-16}$—$(O$—$C_2H_4)_{1-25}$—$OH$, such as octaethylene glycol monododecyl ether and pentaethylene glycol monododecyl ether; polypropylene glycol alkyl ethers having the formula: $CH_3$—$(CH_2)_{10-16}$—$(O$—$C_3H_6)_{1-25}$—$OH$; glucoside alkyl ethers having the formula $CH_3$—$(CH_2)_{10-16}$—$(O$-glucoside$)_{1-3}$-$OH$, such as decyl glucoside, lauryl glucoside, octyl glucoside; polyethylene glycol octylphenyl ethers having the formula $C_8H_{17}$—$(C_6H_4)$—$(O$—$C_2H_4)_{1-25}$—$OH$, such as Triton X-100; polyethylene glycol alkylphenyl ethers having the formula $C_9H_{19}$—$(C_6H_4)$—$(O$—$C_2H_4)_{1-25}$—$OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

Quaternary ammonium surfactants are composed of a positively charged nitrogen atom ($N^+$) bound to four chemical groups (often alkyl or aryl groups) and an anion (e.g., chloride, bromide, sulfate). The ammonium ion may be associated with or coordinated to to a negatively charged counterion, such as chloride ($Cl^-$), bromide ($Br^-$), or sulfate ($SO_4^{2-}$). Suitable examples of quaternary ammonium surfactants include, but are not limited to, CTAB, dodecyltrimethylammonium chloride (DTAC), benzalkonium chloride, stearyltrimethylammonium chloride (STAC), and tetradecyltrimethylammonium bromide (TTAB). In a preferred embodiment, the quaternary ammonium surfactant is CTAB. In some embodiments, the quaternary ammonium surfactant occupies sodium (Na) vacancies in the porous aluminosilicate material or a surface thereof.

In some embodiments, the geopolymer composite has a ratio of porous aluminosilicate material to the quaternary ammonium surfactant of 1:1 to 10:1, preferably 2:1 to 9:1, preferably 3:1 to 8:1, preferably 4:1 to 7:1, preferably 5:1 to 6:1 by weight.

In some embodiments, the geopolymer composite includes a hydrophobicity modifier. A hydrophobicity modifier is a substance or chemical compound that makes a surface more hydrophobic or water-repellent. These modifiers function by changing the surface energy of a material, preventing water from spreading or clinging to it. Suitable examples of hydrophobicity modifiers include, but are not limited to, fluorochemicals such as perfluorooctyltrichlorosilane (PFOTS), perfluorooctanoic acid (PFOA), and polytetrafluoroethylene (PTFE), silane-based compounds such as octadecyltrichlorosilane (OTS), trimethoxy (octadecyl) silane, and methyltrimethoxysilane (MTMS). In some embodiments, the hydrophobicity modifier includes dibenzoylmethane. In some embodiments, the hydrophobicity modifier is disposed on the quaternary ammonium surfactant. In some embodiments, the hydrophobicity modifier can be covalently attached to the quaternary ammonium surfactant. In general, the hydrophobicity modifier can be covalently attached to any part of the quaternary ammonium surfactant. In some embodiments, the hydrophobicity modifier can be covalently attached to a hydrophobic tail of the quaternary ammonium surfactant. For example, when the quaternary ammonium surfactant is CTAB, the hydrophobicity modifier can be covalently attached to the cetyl group of the CTAB. In some embodiments, the hydrophobicity modifier is not covalently attached to the quaternary ammonium surfactant. In such embodiments, the hydrophobicity modifier can interact with a portion of the quaternary ammonium surfactant by a non-covalent interaction, such as a Van der Waals interaction, an ionic interaction, or some other interaction or combination of interactions. In some embodiments, the hydrophobicity modifier is not covalently attached to the CTAB and interacts with the hydrophobic tail of the CTAB surfactant that is anchored on the geopolymer surface. This may allow for forming final composite. For example, the dibenzoylmethane molecules may become attached to, disposed upon, or embedded within the CTAB present on a surface of the functionalized geopolymer structure.

In some embodiments, the geopolymer composite has a ratio of porous aluminosilicate material to the hydrophobicity modifier of 1:5 to 5:1, preferably 1:4 to 4:1, preferably 1:3 to 3:1, preferably 1:2.5 to 2.5:1, preferably 1:2.0 to 2.0:1, preferably 1:1.5 to 1.5:1, preferably 1:1.25 to 1:1.25, preferably 1:1.1 to 1.1:1, preferably about 1:1 by weight.

In some embodiments, the geopolymer composite includes preferably 37.5 to 52.5 wt. %, preferably 40.0 to 51.0 wt. %, 41.0 to 50.0 wt. %, preferably 42.0 to 49.0 wt. %, preferably 43.0 to 48.0 wt. %, preferably 43.5 to 47.5 wt. %, preferably 44.0 to 47.0 wt. %, preferably 44.5 to 46.5 wt. %, preferably 45.0 to 46.0 wt. %, preferably 45.25 to 45.5 wt. % porous aluminosilicate material, based on a total weight of geopolymer composite.

In some embodiments, the geopolymer composite includes preferably 37.5 to 52.5 wt. %, preferably 40.0 to 51.0 wt. %, 41.0 to 50.0 wt. %, preferably 42.0 to 49.0 wt. %, preferably 43.0 to 48.0 wt. %, preferably 43.5 to 47.5 wt. %, preferably 44.0 to 47.0 wt. %, preferably 44.5 to 46.5 wt. %, preferably 45.0 to 46.0 wt. %, preferably 45.25 to 45.5 wt. % hydrophobicity modifier, based on a total weight of geopolymer composite.

In some embodiments, the geopolymer composite includes 1 to 15 wt. % preferably 2.0 to 14.0 wt. %, preferably 4.0 to 13.0 wt. %, preferably 5.0 to 12.0 wt. %, preferably 6.0 to 12.0 wt. %, preferably 7.0 to 11.0 wt. %, preferably 8.0 to 10.0 wt. %, preferably 8.5 to 9.5 wt. %, preferably 9.0 to 9.25 wt. % quaternary ammonium surfactant, based on a total weight of the geopolymer composite.

In some embodiments, the geopolymer composite is amorphous by powder X-ray diffraction (PXRD). That is, by PXRD, the geopolymer composite lacks a well-defined crystalline structure. In some embodiments, the geopolymer composite and its constituents exist as disordered, non-crystalline materials. This amorphous nature may be advantageous to improve surface reactivity and/or surface area. The amorphous nature may make the geopolymer composite more suited for adsorption and catalysis, where increased surface area and interaction with the surroundings are advantageous.

In some embodiments, the geopolymer composite includes 4.0 to 8.5 wt. % aluminum, preferably 5.0 to 7.0 wt. %, preferably 5.5 to 6.5 wt. %, preferably 6.0 to 6.25 wt. % aluminum, based on a total weight of geopolymer composite.

In some embodiments, the geopolymer composite includes 15.0 to 25.0 wt. % silicon, preferably 16.0 to 24.5 wt. %, preferably 16.5 to 24.0 wt. %, preferably 17.0 to 23.5 wt. %, preferably 17.5 to 23.0 wt. %, preferably 18.0 to 22.5 wt. %, preferably 18.5 to 22.0 wt. %, preferably 19.0 to 21.5 wt. %, preferably 19.5 to 21.25 wt. %, preferably 20.0 to 21.0 wt. %, preferably 20.5 to 20.75 wt. % silicon, based on a total weight of geopolymer composite.

In some embodiments, the geopolymer composite includes 24 to 35 wt. % carbon, preferably 24.5 to 34.0 wt. %, preferably 25.0 to 33.5 wt. %, preferably 25.5 to 33.0 wt. %, preferably 26.0 to 32.5 wt. %, preferably 26.5 to 32.0 wt. %, preferably 27.0 to 31.5 wt. %, preferably 27.5 to 31.0 wt. %, preferably 28.0 to 30.5 wt. %, preferably 28.25 to 30.0 wt. %, preferably 28.5 to 29.5 wt. %, preferably 28.75 to 29.25 wt. % carbon, based on the total weight of geopolymer composite.

In some embodiments, the geopolymer composite includes 6.25 wt. % aluminum, 20.56 wt. % silicon, and 28.99 wt. % carbon, each based on the total weight of the geopolymer composite.

In some embodiments, the geopolymer composite is substantially free of sodium. In some embodiments, the geopolymer composite is devoid of sodium. Such a determination of the sodium content (or lack thereof) can be performed by EDX.

In some embodiments, the geopolymer composite is substantially free of an organosilicon compound. In some embodiments, the geopolymer composite is devoid of an organosilicon compound. That is, in some embodiments, the geopolymer does not include an organosilicon or use a silane surface modifying agent.

In some embodiments, the geopolymer composite is porous. A porous material is one that forms a porous bulk solid. In general, the pores may be micropores, mesopores, macropores, and/or a combination thereof. The term 'microporous' means the pores of the material have pores with an average pore width (diameter) of less than 2 nm. The term 'mesoporous' means the pores of the material have an average pore width of 2 to 50 nm. The term 'macroporous' means the pores of crosslinked polymer have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, the geopolymer composite has a mean pore diameter of 6.75 to 9.00 nm, preferably 6.80 to 8.90 nm, preferably 6.85 to 8.85 nm, preferably 6.90 to 8.80 nm, preferably 6.95 to 8.75 nm, preferably 7.00 to 8.70 nm, preferably 7.05 to 8.65 nm, preferably 7.10 to 8.60 nm, preferably 7.15 to 8.55 nm, preferably 7.20 to 8.50 nm, preferably 7.25 to 8.45 nm, preferably 7.30 to 8.40 nm, preferably 7.35 to 8.35 nm, preferably 7.40 to 8.30 nm, preferably 7.45 to 8.25 nm, preferably 7.50 to 8.20 nm, preferably 7.55 to 8.15 nm, preferably 7.60 to 8.10 nm, preferably 7.65 to 8.05 nm, preferably 7.70 to 8.00 nm, preferably 7.75 to 7.95 nm, preferably 7.80 to 7.90 nm. In some embodiments, the geopolymer composite has a mean pore diameter of 7.85 nm.

In some embodiments, the geopolymer composite has a pore volume of 0.175 to 0.250 cubic centimeters per gram ($cm^3/g$), preferably 0.180 to 0.245 $cm^3/g$, preferably 0.185 to 0.240 $cm^3/g$, preferably 0.190 to 0.235 $cm^3/g$, preferably 0.195-0.230 $cm^3/g$, preferably 0.200 to 0.225 $cm^3/g$, preferably 0.205 to 0.220 $cm^3/g$, preferably 0.210 to 0.215 $cm^3/g$. In some embodiments, the geopolymer composite has a pore volume of 0.2102 $cm^3/g$.

In some embodiments, the geopolymer composite has a surface area of 47.0-60.0 square meters per gram ($m^2/g$), preferably 47.5 to 59.5 $m^2/g$, preferably 48.0 to 59.0 $m^2/g$, preferably 48.5 to 58.5 $m^2/g$, preferably 49.0 to 58.0 $m^2/g$, preferably 49.5 to 57.5 $m^2/g$, preferably 50.0 to 57.0 $m^2/g$, preferably 50.5 to 56.5 $m^2/g$, preferably 51.0 to 56.0 $m^2/g$, preferably 51.5 to 55.5 $m^2/g$, preferably 52.0 to 55.0 $m^2/g$, preferably 52.5 to 54.5 $m^2/g$, preferably 53.0 to 54.0 $m^2/g$. In some embodiments, the geopolymer composite has a surface area of 53.53 $m^2/g$.

Figure 1A:
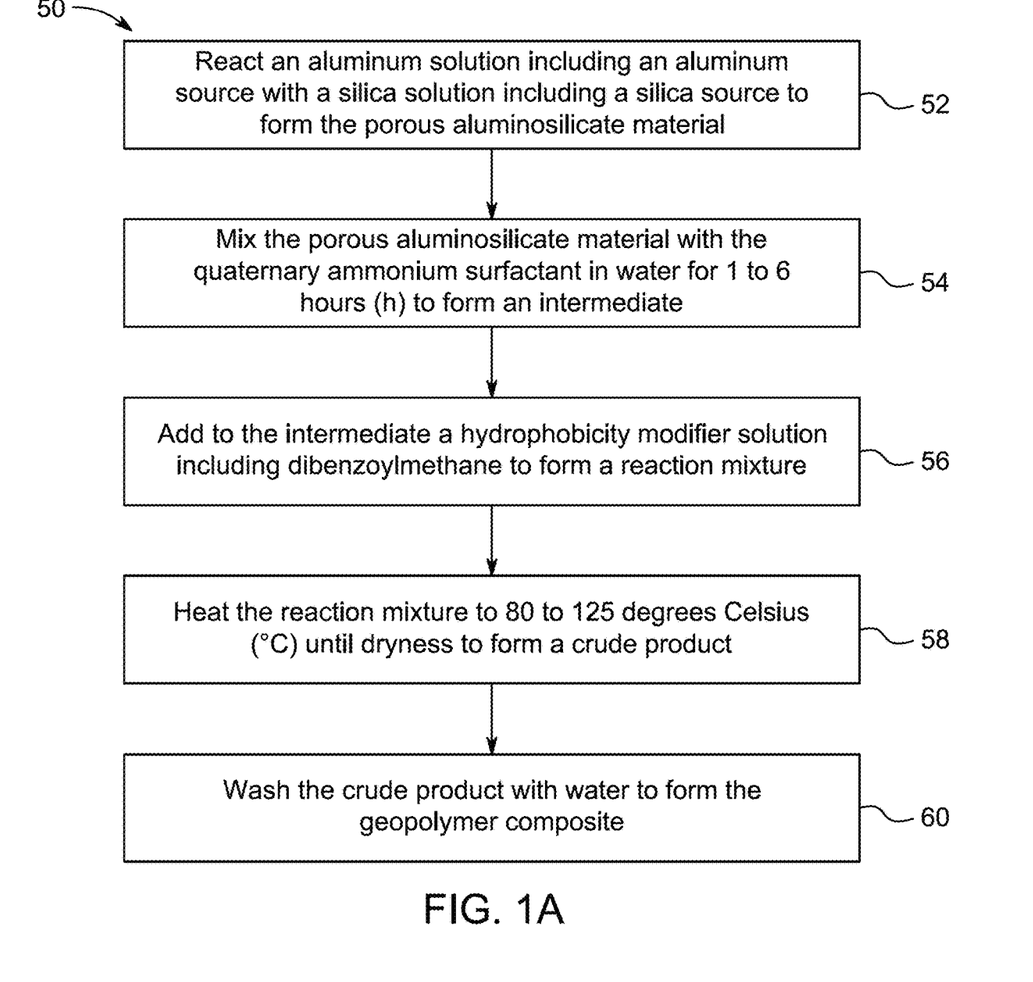
FIG. 1A is a method flowchart for forming a geopolymer composite (geopolymer@CTAB@dibenzoylmethane), according to certain embodiments.

FIG. 1A illustrates a flow chart of a method 50 of a method of forming the geopolymer composite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes reacting an aluminum solution including an aluminum source with a silica solution including a silica source to form the porous aluminosilicate material. In general, the aluminum source can be any suitable aluminum source. Suitable examples of aluminum sources include, but are not limited to, aluminum nitrate, aluminum sulfate, aluminum chloride, aluminum phosphate, aluminum acetate, aluminum hydroxide, aluminum citrate, aluminum hydroxide, or its hydrate, or mixtures thereof. In some embodiments, the aluminum source is aluminum chloride ($AlCl_3 \cdot 6H_2O$).

In general, the silica source can be any suitable silica source. Suitable examples of silica sources include, but are not limited to, sodium silicate, sodium metasilicate, potassium silicate, calcium metasilicate, magnesium silicate, aluminum silicate, barium metasilicate, strontium silicate, zinc silicate, silica gel, fumed silica, rice husk ash, diatomaceous earth, and fly ash. In some embodiments, the silica source is sodium metasilicate ($Na_2SiO_3 \cdot 5H_2O$).

At step 54, the method 50 includes mixing the porous aluminosilicate material with the quaternary ammonium surfactant in water for 1 to 6 hours (h), preferably 2 to 5 h, and preferably 3 to 4 h to form an intermediate. In general, the water may be any suitable water, such as tap water, distilled water, double-distilled water, deionized water, deionized distilled water, reverse osmosis water, and/or some other water. In some embodiments, the water is distilled water. In some embodiments, the quaternary ammonium surfactant is CTAB.

In some embodiments, the porous aluminosilicate material is mixed with the quaternary ammonium surfactant in a ratio of 1:1 to 10:1, preferably 2:1 to 9:1, preferably 3:1 to 8:1, preferably 4:1 to 7:1, preferably 5:1 to 6:1 by weight. The mixing may be carried out manually or with the help of a stirrer. In some embodiments, the method further includes, prior to the mixing, washing the porous aluminosilicate material with water.

At step 56, the method 50 includes adding the hydrophobicity modifier solution including dibenzoylmethane to the intermediate to form a reaction mixture. In some embodiments, the hydrophobicity modifier solution includes methanol. In some embodiments, the hydrophobicity modifier is dibenzoylmethane. In some embodiments, the reaction mixture has a weight ratio of intermediate to hydrophobicity modifier of 0.25:1 to 4:1, preferably 0.5:1 to 3.5:1, preferably 1:1 to 3:1, preferably 1.5:1 to 2.5:1, preferably 2:1.

At step 58 the method 50 includes heating the reaction mixture to 80 to 125° C., preferably 85 to 120° C., preferably 90 to 115° C., preferably 95 to 110° C., preferably 100 to 105° C., until dryness to form a crude product. In general, the reaction mixture may be heated using heating appliances such as hot plates, heating mantles, hot air ovens, microwaves, autoclaves, tapes, oil baths, salt baths, sand baths, air baths, hot-tube furnaces, and hot-air guns.

At step 60 the method 50 includes washing the crude product with water to form the geopolymer composite. The washing may be advantageous for removing any residual impurities or unreacted compounds. The washing may be done by using a solvent like water, alcohol, or a mixture thereof. Suitable solvents of alcoholic solvents include methanol, ethanol, and isopropanol (IPA). The water may be tap water, distilled water, bi-distilled water, deionized water, deionized distilled water, reverse osmosis water, and/or some other water. In some embodiments, the washing is done using distilled water.

Figure 1B:
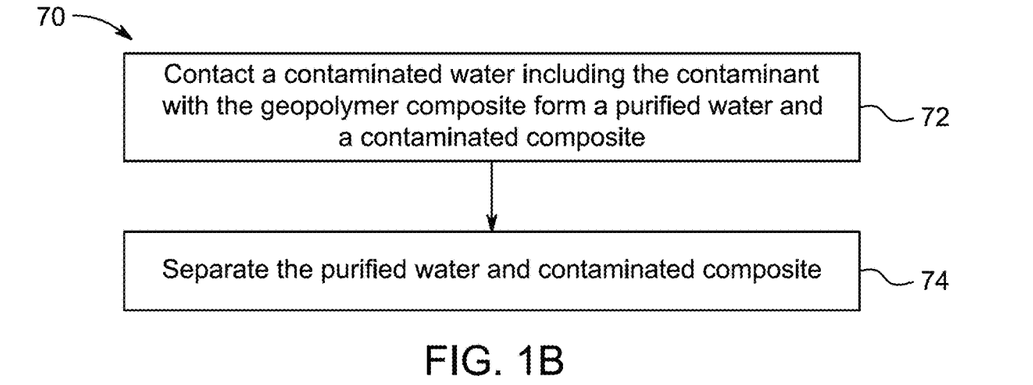
FIG. 1B is a method flowchart for removing a contaminant from water using the geopolymer composite, according to certain embodiments.

FIG. 1B illustrates a flow chart of a method 70 of removing a contaminant from water, according to certain embodiments. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes contacting a contaminated water including the contaminant with the geopolymer composite thereby forming a purified water and a contaminated composite. The contaminant is at least one selected from the group consisting of a dye, a phenol, a polycyclic aromatic hydrocarbon, an herbicide, a pesticide, an antibiotic, a persistent organic pollutant, and a heavy metal.

A dye is a colored substance that chemically binds to a material it may be intended to color. Generally, a dye is applied to the solution, typically an aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxypyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses. A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide. A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphosmethyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorphacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

In some embodiments, the contaminant is an antibiotic. Suitable examples of antibiotics include, but are not limited to, penicillin, amoxicillin, tetracycline, ciprofloxacin, erythromycin, vancomycin, chloramphenicol, streptomycin, doxycycline, cephalexin, and levofloxacin. These antibiotics are commonly found as environmental contaminants due to their widespread use in medicine and agriculture.

In some embodiments, the contaminant is a polycyclic aromatic hydrocarbon (PAH). Suitable examples include, but are not limited to, benzo[a]pyrene, naphthalene, anthracene, pyrene, fluorene, phenanthrene, chrysene, benz[a]anthracene, benzo[b]fluoranthene, dibenz[a,h]anthracene, and indeno[1,2,3-cd]pyrene. These compounds are often released from sources such as automobile exhaust, industrial processes, and incomplete combustion of organic matter.

In some embodiments, the contaminant is a heavy metal. Heavy metals are generally classified by their high density and atomic weight. Additionally, certain elements, including metalloids exhibiting high toxicity to both humans and the environment, are also included in heavy metals. These heavy metals enter into various environmental compartments through natural and anthropogenic sources, ultimately finding their way into the human body through the food chain. Typically, heavy metal concentrations in natural water bodies are relatively low. However, even at lower concentrations, certain heavy metals can pose severe health risks. The most significant concern arises when industrial facilities discharge metal-contaminated effluents and wastewater into freshwater bodies without adequate treatment. This indiscriminate release further intensifies the contamination issue and poses a serious threat to the environment. Suitable examples of heavy metal ions include, but are not limited to, ions of lead (Pb), mercury (Hg), cadmium (Cd), chromium (Cr), arsenic (As). Further, these metal ions may be of any oxidation state M+1, M+2, M+3, etc. Exemplary additional metal ions include, but are not limited to, Ag, Na, Li, Mn, Fe, Co, Ni, Cu, Sn, Fe, As, Sb, Zn, V, Pt, Pd, Rh, Al, and mixtures thereof in various oxidation states such as +1, +2 and +3.

In some embodiments, the geopolymer composite may be free flowing or supported on or within a substrate, for example, a column. Examples of supported geopolymer composites include materials and geometries where the geopolymer composite is supported within a fixed bed, a static packed bed, a fluidized bed, embedded in a porous support (such as a porous polymer matrix), in or on a ceramic support, in or on a polymer support, or in or on a silica support. In some embodiments, the geopolymer composite is employed in an amount of 0.1 to 20 mg/mL, preferably 0.25 to 15 mg/mL, preferably 0.5 to 12.5 mg/mL, preferably 0.75 to 10 mg/mL, preferably 1 to 5 mg/ml of water to have a contaminant removed.

In some embodiments, the method involves addition of geopolymer composite in powdered form to the water to have a contaminant be removed to form a purification mixture. In some embodiments, the purification mixture is shaken, stirred, agitated, or other method of achieving temporary homogeneity of the purification mixture. In some embodiments, the purification mixture is shaken at 10 to 1000 rpm, preferably 50 to 500 μm, preferably 125 to 250 rpm, preferably 150 rpm.

In some embodiments, the contacting comprises delivering a mixture into a feed side of a chamber comprising the geopolymer composite in a supported form that divides the chamber into the feed side and a permeate side, such that at least a portion of the water permeates the geopolymer composite and recovering from the permeate side purified water depleted in the contaminant compared to the water supplied to the feed side. The chamber used for the present method may be of any shape so long as the geopolymer composite can be securely housed and utilized inside the chamber to accomplish the removal of the contaminant. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the water into contact with the geopolymer composite. The water may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the water may stay stagnant over the geopolymer composite or be stirred, shaken, or agitated as previously described.

In some embodiments, the water used in the method has a temperature of 1 to 99° C., preferably 20 to 90° C., preferably 21 to 75° C., preferably 25 to 50° C. In some embodiments, the water has a pH of 6.5 to 14, preferably 6.6 to 13, preferably 6.75 to 12, preferably 7 to 11. In some embodiments, the water and the geopolymer composite are in contact for 1 to 120 minutes, preferably 5 to 105 minutes, preferably 10 to 90 minutes.

In some embodiments, the contacting is performed by passing the water through the geopolymer composite. In some embodiments, the geopolymer composite may be used in series with other currently known adsorption materials to enhance the removal of an organic pollutant or heavy metal from water or to remove a different type of impurity from water that is not an organic pollutant or heavy metal.

In terms of the present disclosure, the adsorption interaction between the contaminant and the geopolymer composite may be chemisorption, physisorption, or mixtures thereof. In some embodiments, the contaminant is adsorbed onto the geopolymer composite via a physisorption process, meaning the process is primarily physical and preferably no chemical changes occur on the geopolymer composite or contaminant.

In some embodiments, the purified water has least 77.5% less contaminant than that present in the water before contact with the geopolymer composite, preferably at least 80% less, preferably at least 82.5% less, preferably at least 85% less, preferably at least 87.5% less, preferably at least 90% less, preferably at least 92.5% less, preferably at least 95% less, preferably at least 97.5% less, preferably at least 99% less than that present in the water before contact with the geopolymer composite. That is, the geopolymer composite removes at least 77.5%, preferably at least 80%, preferably at least 82.5%, preferably at least 85%, preferably at least 87.5%, preferably at least 90%, preferably at least 92.5%, preferably at least 95%, preferably at least 97.5%, preferably at least 99% of an initial amount of contaminant present in the water. In some embodiments, the purified water is substantially free of the contaminant, for example, the stream contains less than 10 ppm, preferably less than 1 ppm, preferably less than 100 ppb, preferably less than 1 ppb, preferably less than 0.1 ppb, preferably less than 1 ppt of the contaminant. In some embodiments, the purified water is devoid of the contaminant.

At step 74, the method 70 includes separating the purified water and contaminated composite. The separation of the contaminated composite from the solution may be done via filtration, centrifugation, evaporation, or heated evaporation.

In some embodiments, the method further includes eluting the contaminant from the contaminated composite. The eluting can be performed by any suitable method and using any suitable materials known to one of ordinary skill in the art. In some embodiments, the eluting is performed by washing the geopolymer composite which has adsorbed a contaminant with a suitable wash solvent. The wash solvent can be any suitable solvent, such as water, a surfactant solution, an organic solvent, or mixtures thereof. Suitable solvents of wash solvents include methanol, ethanol, n-propanol, n-butanol, iso-butanol and IPA. The water may be tap water, distilled water, bi-distilled water, deionized water, deionized distilled water, reverse osmosis water, and/or some other purified water. Washing may be helpful to remove contaminants and restore the effectiveness of the composite for reuse. The washing may take place with agitation, such as stirring or ultrasonication or may take place without agitation. Following the eluting, the geopolymer composite may be referred to as a "regenerated geopolymer composite". The geopolymer composite of the present disclosure may be regenerated (i.e. eluted) and reused up to 2 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in a contaminant uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles. The geopolymer composite of the present disclosure may be regenerated (i.e. eluted) and reused up to 2 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in the pure water flux, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles.

EXAMPLES

The following examples demonstrate a geopolymer composite for water decontamination. The examples are provided solely for illustration and are not to be construed as limitations of the present disclosure, as many variations thereof are possible without departing from the spirit and scope of the present disclosure.

Example 1: Chemicals

All chemicals used were purchased from Sigma-Aldrich Chemical Company. Aluminum chloride hexahydrate ($AlCl_3 \cdot 6H_2O$), sodium metasilicate pentahydrate ($Na_2SiO_3 \cdot 5H_2O$), cetyltrimethylammonium bromide (CTAB) ($C_{19}H_{42}BrN$), and dibenzoylmethane ($C_{15}H_{12}O_2$) were employed as the primary reagents in the synthesis of the geopolymer@CTAB@dibenzoylmethane composite.

Example 2: Synthesis of Geopolymer

Figure 2:
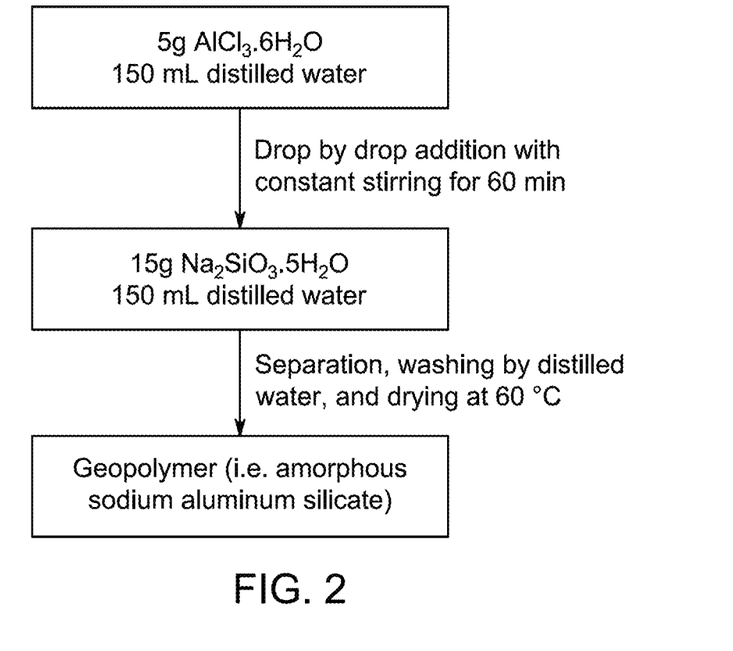
FIG. 2 illustrates a synthesis process of the geopolymer, according to certain embodiments.

In the synthesis of geopolymer, 15 grams (g) of $Na_2SiO_3 \cdot 5H_2O$ was dissolved in 150 milliliters (mL) of distilled water (step 1). Separately, 5 g of $AlCl_3 \cdot 6H_2O$ was dissolved in 150 mL of distilled water (step 2). The solution from step 2 was then added to the solution from step 1, and the resulting mixture was stirred continuously for 60 minutes (min). The formed geopolymer was subsequently separated, washed with distilled water, and dried at 60 degrees Celsius (° C.). FIG. 2 illustrates the synthesis process of geopolymer.

Example 3: Synthesis of Geopolymer@CTAB@Dibenzoylmethane Composite

Figure 3:
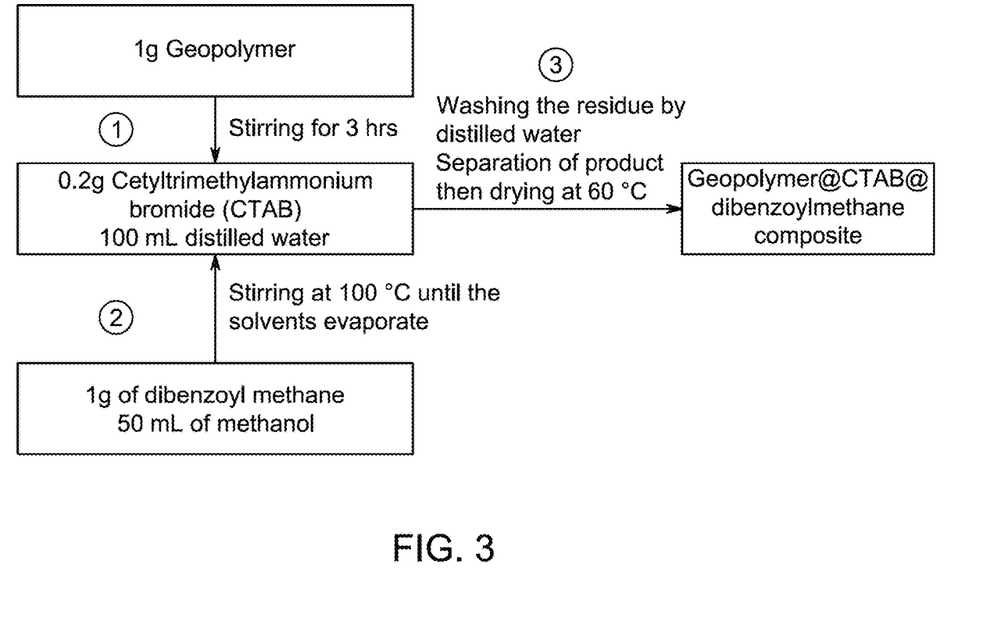
FIG. 3 illustrates a synthesis process of the geopolymer composite, according to certain embodiments.

In the synthesis of the geopolymer composite, 0.2 g of CTAB was dissolved in 100 mL of distilled water. Then, 1 g of geopolymer was added to the CTAB solution, and the mixture was stirred continuously for 3 hours (h). Separately, 1 g of dibenzoylmethane was dissolved in 50 mL of methanol. This solution was added to the geopolymer-CTAB mixture, and the combined solution was stirred at 100° C. until the solvents evaporated. The formed geopolymer@CTAB@dibenzoylmethane composite was washed with distilled water, separated, and dried at 60° C. FIG. 3 illustrates the synthesis process of the geopolymer composite.

Example 4: Physical and Chemical Characterization

Figure 4:
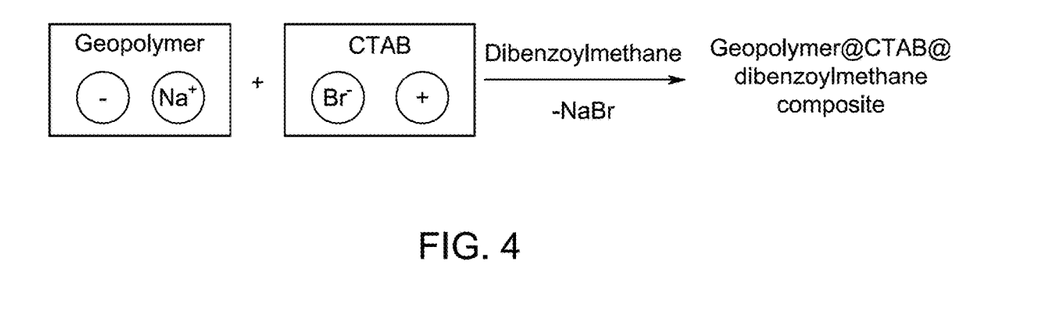
FIG. 4 is a schematic representation of the mechanism of the synthesis process of the geopolymer composite according to certain embodiments.

FIG. 4 is a schematic representation of the mechanism of the synthesis process of the geopolymer composite. It illustrates the ion exchange between sodium and bromide ions, leading to the formation of NaBr as a by-product. The process of synthesizing the geopolymer composite begins by introducing CTAB to the geopolymer. The geopolymer, which has a negatively charged framework due to the presence of $AlO_4$ tetrahedra, is initially neutralized by sodium cations ($Na^+$). Upon addition of CTAB, an ion exchange occurs between the sodium ions ($Na^+$) of the geopolymer and the bromide ions (Br) of CTAB. CTAB has a positively charged quaternary ammonium head, which interacts electrostatically with the negatively charged geopolymer structure, displacing the sodium ions. As a result of this interaction, NaBr is formed as a by-product. After CTAB is attached to the geopolymer, dibenzoylmethane is introduced. Dibenzoylmethane, a hydrophobic organic molecule, is attracted to the hydrophobic tail of the CTAB surfactant that is now anchored on the geopolymer surface. This allows for forming the final composite, where dibenzoylmethane molecules become embedded within the CTAB-functionalized geopolymer structure.

Figure 5A:
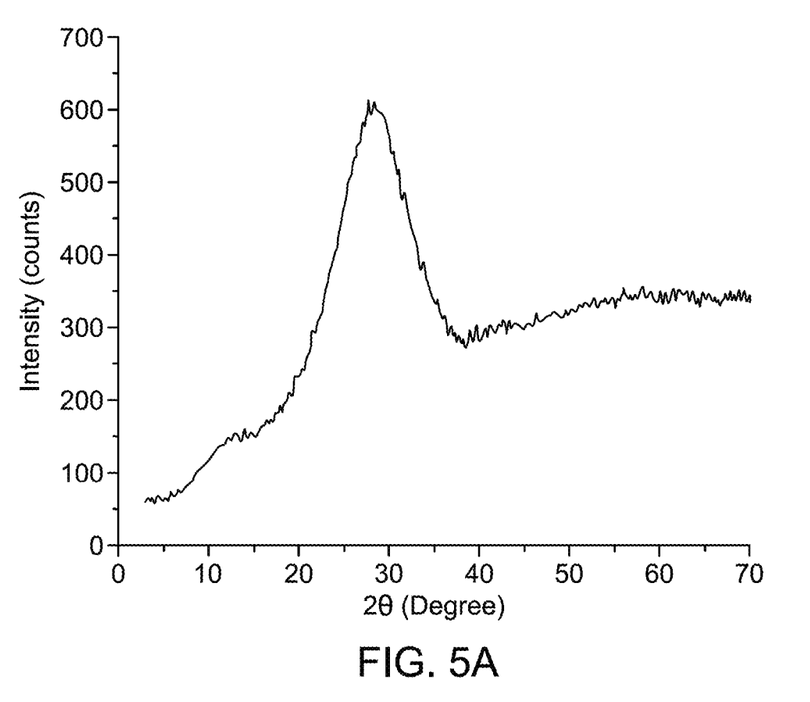
FIG. 5A shows an X-ray diffraction (XRD) pattern for the geopolymer, according to certain embodiments.
Figure 5B:
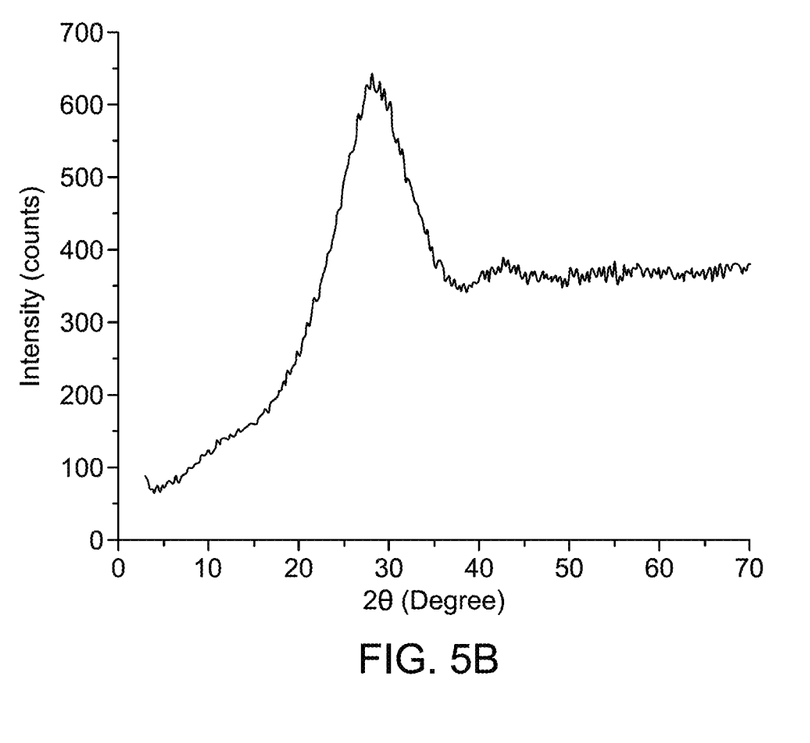
FIG. 5B shows an XRD pattern for the geopolymer composite, according to certain embodiments.

The XRD patterns of geopolymer and geopolymer composite are shown in FIG. 5A-5B, respectively. Both samples exhibit a broad diffraction band at a 2θ angle of approximately 28°, indicating their amorphous nature. The broad band observed in both patterns is characteristic of the disordered atomic arrangement, confirming that neither the geopolymer nor the geopolymer composite possesses a long-range crystalline order. This broad band reflects the typical amorphous property, where the lack of sharp peaks signifies the absence of well-defined crystal structures in both materials. Thus, the XRD results provide clear evidence of the amorphous structure of both the geopolymer and its composite form.

Figure 6A:
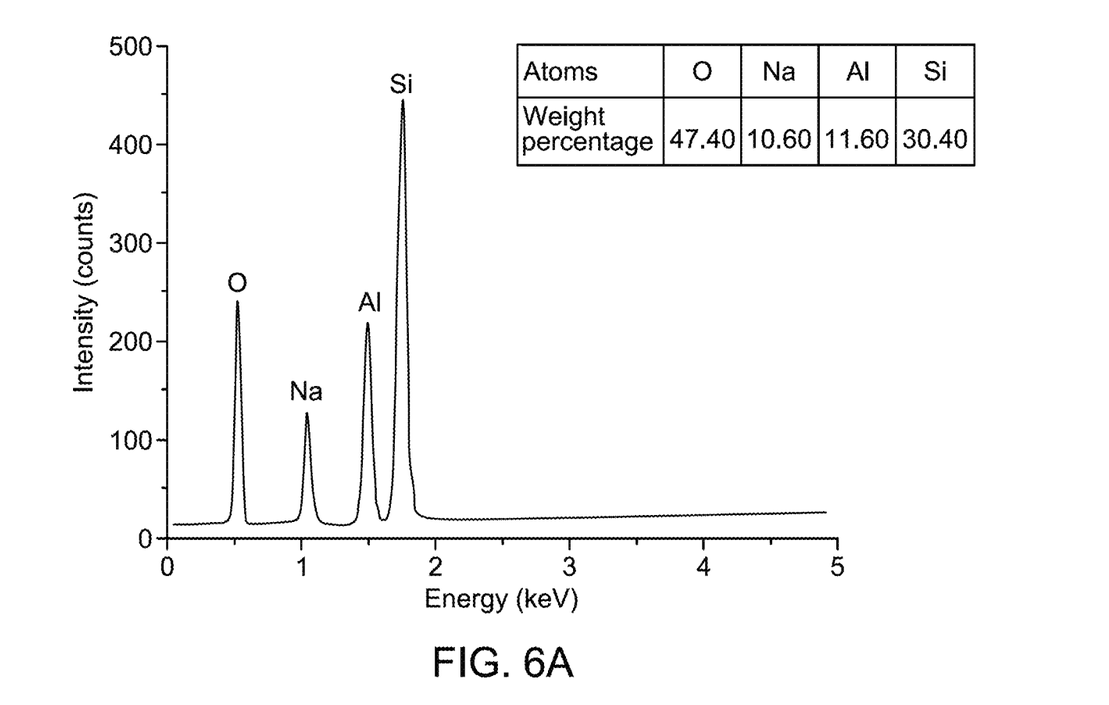
FIG. 6A shows an energy-dispersive X-ray spectroscopy (EDX) spectra for the geopolymer, according to certain embodiments.
Figure 6B:
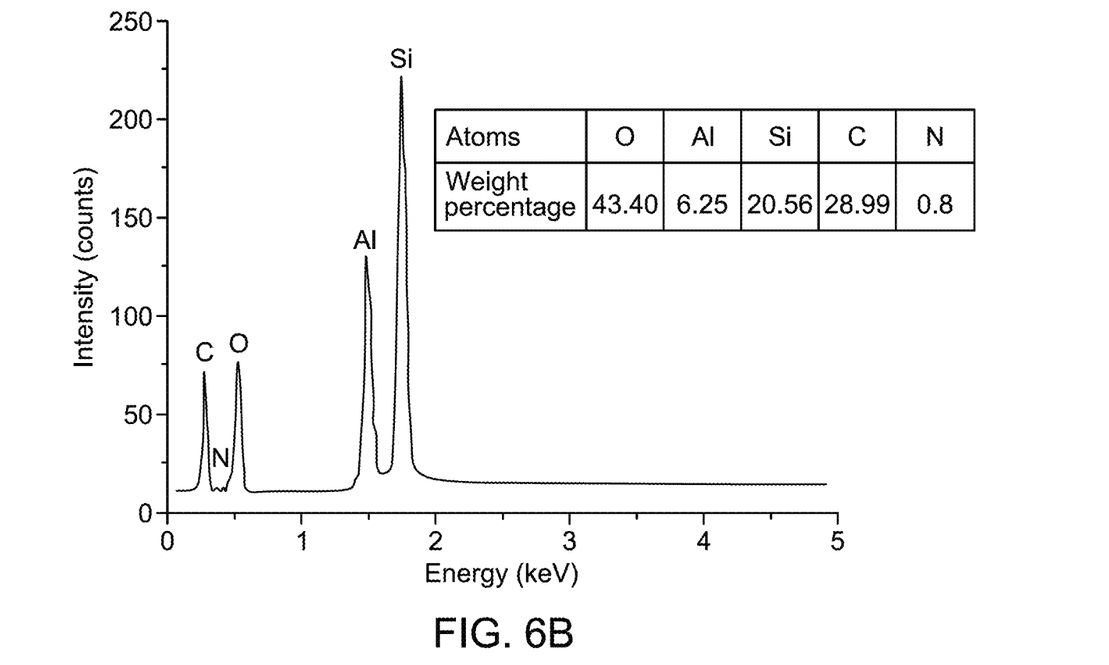
FIG. 6B shows an EDX spectrum for the geopolymer composite, according to certain embodiments.

EDX results of the geopolymer and geopolymer composite are presented in FIG. 6A-6B, respectively. In FIG. 6A, the EDX spectrum of the geopolymer shows the presence of oxygen (O), sodium (Na), aluminum (Al), and silicon (Si), with weight percentages of 47.40%, 10.60%, 11.60%, and 30.40%, respectively. These elements represent the typical composition of the geopolymer structure. In contrast, FIG. 6B, which shows the EDX spectrum of the geopolymer composite, reveals the presence of oxygen (O), aluminum (Al), silicon (Si), carbon (C), and nitrogen (N) with respective weight percentages of 43.40%, 6.25%, 20.56%, 28.99%, and 0.8%. The appearance of carbon and nitrogen in the geopolymer composite indicates the successful incorporation of CTAB and dibenzoylmethane into the geopolymer matrix. No sodium (Na) was observed. These results indicate success of the structural modification of the geopolymer upon the addition of CTAB and dibenzoylmethane.

Figure 7:
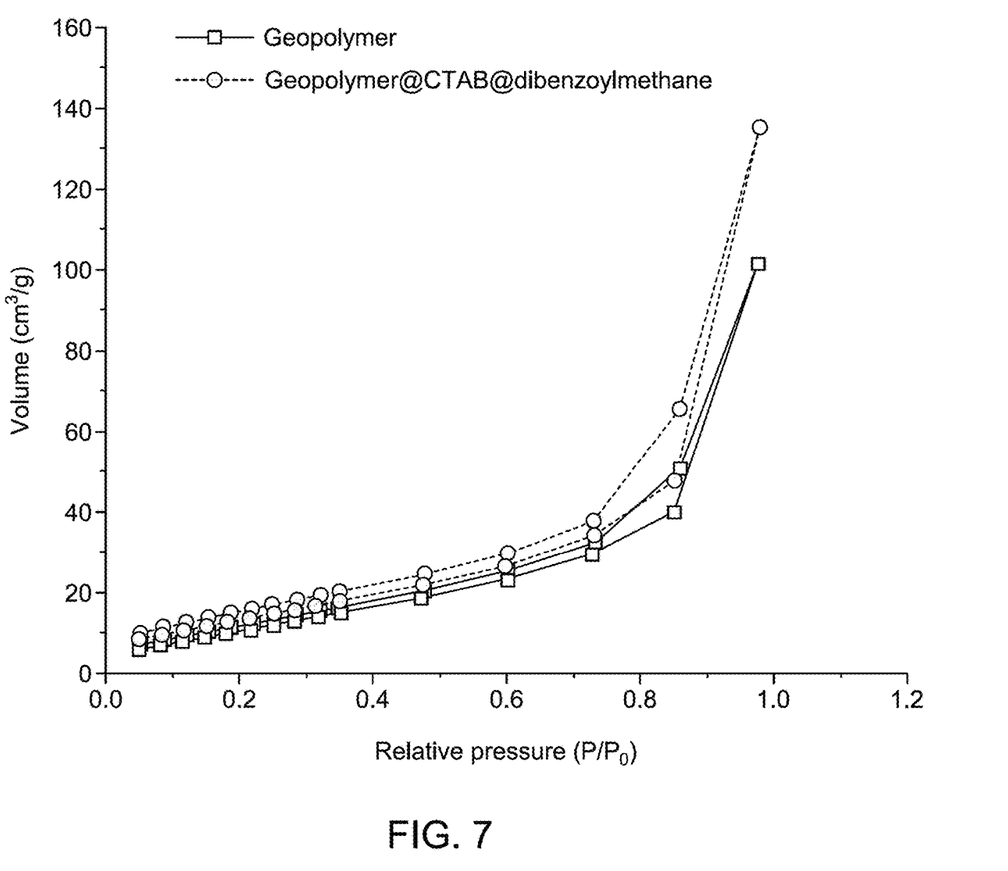
FIG. 7 shows a Brunauer-Emmett-Teller (BET) nitrogen ($N_2$) adsorption/desorption analysis of the geopolymer composite, according to certain embodiments.

FIG. 7 shows the BET $N_2$ adsorption/desorption isotherm of the geopolymer composite, which exhibits a type IV isotherm characteristic of mesoporous materials. Table 1 provides detailed surface texture characteristics of the geopolymer and the geopolymer composite. The BET surface area of the geopolymer was 46.45 square meters per gram ($m^2/g$), with a total pore volume of 0.1577 cubic centimeters per gram ($cm^3/g$) and a mean pore diameter of 6.79 nanometers (nm). After modification, the geopolymer composite exhibited a higher BET surface area of 53.53 $m^2/g$, a total pore volume of 0.2102 $cm^3/g$, and a mean pore diameter of 7.85 nm. Based on these values, both the geopolymer and its composite fall within the mesoporous range, as their mean pore diameters exceed 2 nm but remain below 50 nm. The increase in surface area, pore volume, and mean pore diameter in the composite indicates the successful modification of the geopolymer with CTAB and dibenzoylmethane, leading to enhanced textural properties that are advantageous for adsorption applications.

TABLE 1

Surface properties of prepared geopolymers.

| Samples | BET surface area ($m^2/g$) | Total Pore Volume ($cm^3/g$) | Mean Pore Diameter (nm) |
|---|---|---|---|
| Geopolymer | 46.45 | 0.1577 | 6.79 |
| Geopolymer Composite | 53.53 | 0.2102 | 7.85 |

The enhanced properties of the geopolymer composite may make it suitable for a wide range of industries. For example, in environmental applications, the material may be used to efficiently remove pollutants, heavy metals, and organic dyes from wastewater, providing a cost-effective and eco-friendly solution for water treatment plants and industries that deal with large-scale waste disposal. The composite's increased surface area and porosity may make it particularly effective in adsorption-based applications, enabling it to outperform traditional geopolymers. In industrial catalysis, the composite can be used in processes that require high surface activity and mesoporous materials, enhancing reaction efficiency and reducing operational costs.

This composite is significantly improved over traditional geopolymers, with enhanced surface area, pore volume, and adsorption capabilities.

The present geopolymer composite based on a porous aluminosilicate material, dibenzoylmethane, and cetyltrimethylammonium bromide (CTAB) (designated as geopolymer@CTAB@dibenzoylmethane) may be advantageous for having improved surface area, pore volume, and adsorption characteristics. These enhancements may make the geopolymer composite more suitable for various industrial applications, such as wastewater treatment, pollutant adsorption, and catalytic processes, where traditional materials may fall short.

Numerous modifications and variations of the present disclosure are possible in light of the above teachings. It is, therefore, to be understood that within the scope of the appended claims, the invention may be practiced otherwise than as specifically described herein.

The invention claimed is:
1. A geopolymer composite, including
a porous aluminosilicate material;
a quaternary ammonium surfactant; and
a hydrophobicity modifier including dibenzoylmethane, wherein
the quaternary ammonium surfactant occupies sodium (Na) vacancies in the porous aluminosilicate material, and
the hydrophobicity modifier is disposed on the quaternary ammonium surfactant.
2. The geopolymer composite of claim 1, wherein the quaternary ammonium surfactant is cetyltrimethylammonium bromide (CTAB).
3. The geopolymer composite of claim 1, wherein the hydrophobicity modifier consists of dibenzoylmethane.
4. The geopolymer composite of claim 1, wherein the geopolymer composite is amorphous by powder X-ray diffraction (PXRD).
5. The geopolymer composite of claim 1, wherein the geopolymer composite is free of sodium by Energy-dispersive X-ray spectroscopy (EDX).

6. The geopolymer composite of claim 1, wherein
the porous aluminosilicate material has an atomic ratio of aluminum to silicon of 1:1 to 1:5.

7. The geopolymer composite of claim 1, which includes
4.0 to 8.5 percent by weight (wt. %) aluminum;
15.0 to 25.0 wt. % silicon; and
24 to 35 wt. % carbon, each based on a total weight of geopolymer composite.

8. The geopolymer composite of claim 1, wherein the geopolymer composite has a surface area of 47.0 to 60.0 square meters per gram ($m^2/g$).

9. The geopolymer composite of claim 1, wherein the geopolymer composite has a pore volume of 0.175 to 0.250 cubic centimeters per gram ($cm^3/g$).

10. The geopolymer composite of claim 1, wherein the geopolymer composite has a mean pore diameter of 6.75 to 8.50 nanometers (nm).

11. The geopolymer composite of claim 1, wherein the geopolymer composite is free of an organosilicon compound.

12. A method of forming the geopolymer composite of claim 1, the method including
reacting an aluminum solution including an aluminum source with a silica solution including a silica source to form the porous aluminosilicate material;
mixing the porous aluminosilicate material with the quaternary ammonium surfactant in water for 1 to 6 hours (h) to form an intermediate;
adding to the intermediate a hydrophobicity modifier solution including dibenzoylmethane to form a reaction mixture;
heating the reaction mixture to 80 to 125 degrees Celsius (° C.) until dryness to form a crude product; and
washing the crude product with water to form the geopolymer composite.

13. The method of claim 12, wherein
the aluminum source is aluminum chloride ($AlCl_3 \cdot 6H_2O$); and
the silica source is sodium metasilicate ($Na_2SiO_3 \cdot 5H_2O$).

14. The method of claim 12, wherein
the quaternary ammonium surfactant is CTAB.

15. The method of claim 12, wherein
the hydrophobicity modifier solution includes methanol.

16. The method of claim 12, wherein
the hydrophobicity modifier consists of dibenzoylmethane.

17. The method of claim 12, wherein
the porous aluminosilicate material is mixed with the quaternary ammonium surfactant in a ratio of 1:1 to 10:1 by weight; and
the reaction mixture has a weight ratio of intermediate to hydrophobicity modifier of 0.25:1 to 4:1.

18. The method of claim 12, wherein
the method further includes, prior to the mixing, washing the porous aluminosilicate material with water.

19. A method of removing a contaminant from water, the method including contacting a contaminated water including the contaminant with the geopolymer composite of claim 1, thereby forming a purified water and a contaminated composite, and
separating the purified water and contaminated composite, wherein
the contaminant is at least one selected from the group consisting of a dye, a phenol, a polycyclic aromatic hydrocarbon, an herbicide, a pesticide, an antibiotic, a persistent organic pollutant, and a heavy metal.

20. The method of claim 19, further including eluting the contaminant from the contaminated composite by washing with a wash solvent.

* * * * *